United States Patent
Saarinen et al.

(10) Patent No.: US 12,167,232 B2
(45) Date of Patent: *Dec. 10, 2024

(54) PROTECTING A MESSAGE TRANSMITTED BETWEEN CORE NETWORK DOMAINS

(71) Applicant: TELEFONAKTIEBOLAGET LM ERICSSON (PUBL), Stockholm (SE)

(72) Inventors: Pasi Saarinen, Spånga (SE); Jesús Ángel De-Gregorio-Rodriguez, Madrid (ES); Christine Jost, Lund (SE); Pablo Martinez De La Cruz, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,339

(22) Filed: Aug. 15, 2023

(65) Prior Publication Data
US 2023/0396994 A1 Dec. 7, 2023

Related U.S. Application Data

(63) Continuation of application No. 16/969,589, filed as application No. PCT/EP2019/053784 on Feb. 15, 2019, now Pat. No. 11,729,609.

(30) Foreign Application Priority Data
Feb. 16, 2018 (EP) .................... 18382092

(51) Int. Cl.
*H04L 9/40* (2022.01)
*H04L 29/06* (2006.01)
(Continued)

(52) U.S. Cl.
CPC ......... *H04W 12/02* (2013.01); *H04L 63/0281* (2013.01); *H04L 67/02* (2013.01);
(Continued)

(58) Field of Classification Search
CPC ... H04W 12/02; H04W 12/03; H04W 12/086; H04W 12/106; H04L 63/0281; H04L 67/02; H04L 63/0428; H04L 63/12
See application file for complete search history.

(56) References Cited

U.S. PATENT DOCUMENTS

| | | |
|---|---|---|
| 6,615,166 B1 | 9/2003 | Guheen et al. |
| 7,826,824 B2 | 11/2010 | Fischer et al. |
| (Continued) | | |

FOREIGN PATENT DOCUMENTS

| | | |
|---|---|---|
| CN | 101005489 A | 7/2007 |
| CN | 103493438 A | 1/2014 |
| (Continued) | | |

OTHER PUBLICATIONS

China Mobile, "Living Document: Security of Service Based Architecture of 5G phase 1", 3GPP TSG SA WG3 (Security) Meeting #91, S3-181474, Apr. 16-20, 2018, Belgrade, Serbia.
(Continued)

*Primary Examiner* — Izunna Okeke

(57) ABSTRACT

Network equipment is configured for use in one of multiple different core network domains of a wireless communication system. The network equipment is configured to receive a message that has been, or is to be, transmitted between the different core network domains. The network equipment is also configured to apply inter-domain security protection to, or remove inter-domain security protection from, one or more portions of the content of a field in the message according to a protection policy. The protection policy includes information indicating to which one or more portions of the content inter-domain security protection is to be applied or removed. The network equipment is also configured to forward the message, with inter-domain security
(Continued)

protection applied or removed to the one or more portions, towards a destination of the message.

16 Claims, 10 Drawing Sheets

(51) Int. Cl.
| | |
|---|---|
| *H04L 67/02* | (2022.01) |
| *H04W 12/02* | (2009.01) |
| *H04W 12/03* | (2021.01) |
| *H04W 12/086* | (2021.01) |
| *H04W 12/106* | (2021.01) |
| *H04W 84/04* | (2009.01) |

(52) U.S. Cl.
CPC ......... *H04W 12/03* (2021.01); *H04W 12/086* (2021.01); *H04W 12/106* (2021.01); *H04W 84/042* (2013.01)

(56) References Cited

U.S. PATENT DOCUMENTS

| | | | |
|---|---|---|---|
| 2006/0106802 A1 | 5/2006 | Giblin et al. | |
| 2007/0005801 A1 | 1/2007 | Kumar et al. | |
| 2008/0133729 A1* | 6/2008 | Fridman ............ | H04L 41/0893 709/223 |
| 2012/0149342 A1 | 6/2012 | Cohen et al. | |
| 2012/0182929 A1 | 7/2012 | Chen et al. | |
| 2013/0203382 A1 | 8/2013 | Takahashi et al. | |
| 2015/0324215 A1* | 11/2015 | Borthakur ........... | G06F 9/45558 718/1 |
| 2016/0021064 A1 | 1/2016 | Lock | |
| 2016/0119289 A1 | 4/2016 | Jain et al. | |
| 2016/0286385 A1 | 9/2016 | Jinsook et al. | |
| 2017/0339240 A1 | 11/2017 | Muller et al. | |
| 2018/0026920 A1 | 1/2018 | Chen et al. | |
| 2018/0049156 A1 | 2/2018 | Laha et al. | |
| 2018/0103427 A1 | 4/2018 | Griot et al. | |
| 2018/0145842 A1 | 5/2018 | Golin | |
| 2019/0253395 A1 | 8/2019 | Bykampadi et al. | |

FOREIGN PATENT DOCUMENTS

| | | |
|---|---|---|
| CN | 105393583 A | 3/2016 |
| CN | 105684387 A | 6/2016 |
| CN | 106027455 A | 10/2016 |
| CN | 106663034 A | 5/2017 |
| CN | 107644313 A | 1/2018 |
| RU | 2550562 C2 | 9/2014 |

OTHER PUBLICATIONS

Ericsson, "Format of message protection policies", 3GPP TSG SA WG3 (Security) Meeting #91Bis, S3-181818, May 21-25, 2018, La Jolla, USA.

Ericsson, "Policies for IE protection at Sepp", 3GPP TSG SA WG3 (Security) Meeting #90Bis, S3-180897, Feb. 26-Mar. 2, 2018, San Diego, USA.

Ericsson, "Sepp Protection Policies", SA3#91, S3-181394, Mar. 22, 2018, SA3 Conference Call.

Ericsson, "Structure for clause 13.2 on Application layer security on the N32 interface", 3GPP TSG-SA WG3 Meeting #91Bis, S3-181817, May 21-25, 2018, La Jolla, USA.

Nokia et al., "Addition of Maximum UE Availability Time", 3GPP TSG-SA WG2 Meeting #120, S2-172190, Mar. 27-31, 2017, Busan, South Korea.

3GPP TS 23.501 V15.0.0, "3rd Generation Partnership Project; Technical Specification Group Services and System Aspects; System Architecture for the 5G System; Stage 2, (Release 15)", 3GPP TS 23.501 V15.0.0, Dec. 2017.

3GPP TS 23.502 V15.0.0, "3rd Generation Partnership Project; Technical Specification Group Services and System Aspects; Procedures for the 5G System; Stage 2 (Release 15)", 3GPP TS 23.502 V15.0.0, Dec. 2017.

CT3, "Presentation sheet for 3GPP Ts 29.251 v1.0.0 on Nu reference point between SCEF and PFDF for sponsored data connectivity for Information", 3GPP TSG CT #75 CP-170101, Mar. 6-7, 2017, Dubrivnik, Croatia.

Ericsson, "[Draft] LS on SBI Design and its Security Implications", 3GPP TSG-SA WG3 Meeting #90, Tdoc S3-180223, Jan. 22-26, 2018, Gothenburg, Sweden.

Ericsson, "Comment contribution to S3-180223 (LS to CT3 CT4 on SBI Design and its Security Implications)", 3GPP TSG SA WG3 (Security) Meeting #90, S3-180341, Jan. 22-26, 2018, Gothenburg, Sweden.

Ericsson, "Discussion on NF access in roaming", 3GPP TSG CT WG4 #82, C4-181040, Jan. 22-26, 2018, Gothenburg, Sweden.

Nokia, "Considerations on applying security on HTTP message payload", 3GPP TSG SA WG3 #90 S3-180260, Jan. 22-26, 2018, Gothenburg, Sweden.

Tim, "Analysis of different approaches for implementing SBA security over N32 reference point", 3GPP TSG SA WG3 #90 S3-180028, Jan. 22-26, 2018, Gothenburg, Sweden.

* cited by examiner

PROTECTING A MESSAGE TRANSMITTED BETWEEN CORE NETWORK DOMAINS

PRIORITY CLAIM

This application is a continuation of U.S. patent application Ser. No. 16/969,589, filed Aug. 13, 2020, granted as U.S. Pat. No. 11,729,609 on Aug. 15, 2023, which is a national stage application of International Patent Application No. PCT/EP2019/053784, filed Feb. 15, 2019, which claims priority to EP Patent Application No. 18382092.7, Feb. 16, 2018, the disclosure disclosures of which are hereby incorporated in their entirety by reference.

TECHNICAL FIELD

The present application relates generally to a wireless communication system, and more particularly relates to protecting a message transmitted between different core network domains of a wireless communication system.

BACKGROUND

A user's serving network domain includes the core network equipment and functions that are local to the user's access point. The user's home network domain includes the core network equipment and functions that are independent of the location of the user's access point. The user's home network domain may for instance manage the user's subscription information and/or home-specific services. When the user's serving network domain is different than the user's home network domain, the serving network domain and home network domain communicate with one another, e.g., for user authentication, for user-specific data/services, etc. In these and other instances, communication between different core network domains should be protected (e.g., with confidentiality and/or integrity protection), to ensure the communication is not inspected or modified by unauthorized parties.

Some contexts complicate protection of inter-domain communication. First, an internetwork exchange provider that supports interconnection between different core network domains may actually need to read and/or modify some of the communication in order to offer certain valuable services to network operators. Second, ensuring proper protection of inter-domain communication in the face of evolving communication formats threatens to impose impractical administrative and operational overhead.

SUMMARY

Some embodiments herein exploit a protection policy for inter-domain security protection of a message transmitted between different core network domains of a wireless communication system. The protection policy may indicate which one or more portions of the message inter-domain security protection is to be applied or removed, e.g., such that protection may be applied or removed selectively to only certain portions of the message. In fact, in some embodiments, the protection policy includes information indicating to which one or more portions of the content of a field in the message inter-domain security protection is to be applied or removed. In this way, protection may be applied or removed selectively to certain portion(s) of a given field's content, rather than the field's content as a whole.

Alternatively or additionally, in some embodiments, a protection policy for inter-domain security protection of a message may be dynamically received and/or updated. For example, in one embodiment, the protection policy applicable for a certain message (e.g., of a specific type) may be dynamically discovered and/or retrieved responsive to receiving the message. In another embodiment, the protection policy applicable for the certain message may be included in or otherwise associated with the message itself.

Selective inter-domain security protection of certain portions of a message (e.g., one or more portions of a certain field's content) according to some embodiments herein may advantageously enable an internetwork exchange provider to read and/or modify the message as needed to offer services to network operators. Alternatively or additionally, dynamic reception and/or updatability of the protection policy according to some embodiments may advantageously provide flexible protection that evolves along with message formatting changes (e.g., attributable to the evolution of network functions in the core network), while minimizing or at least reducing administrative and/or operational overhead that would otherwise be required for such flexibility.

More particularly, embodiments herein include a method performed by network equipment in one of multiple different core network domains of a wireless communication system. The method may comprise receiving a message that has been, or is to be, transmitted between the different core network domains. The method may also comprise applying inter-domain security protection to, or removing inter-domain security protection from, one or more portions of the message (e.g., one or more portions of the content of a field in the message) according to a protection policy. In some embodiments, the protection policy indicates which one or more portions of the message inter-domain security protection is to be applied or removed. For example, in one embodiment, the protection policy includes information indicating to which one or more portions of the content of a field in the message inter-domain security protection is to be applied or removed. In some embodiments, the network equipment may obtain the protection policy by receiving the protection policy, e.g., dynamically in response to a discovery request. In some embodiments, the method further comprises forwarding the message, with inter-domain security protection applied or removed to the one or more portions, towards a destination of the message.

In some embodiments, the message is a Hypertext Transfer Protocol (HTTP) message and the field is an HTTP field. For example, in some embodiments, the HTTP message is an HTTP request message and the field is a path field, and wherein the content of the path field is a request Uniform Resource Identifier, URI.

In some embodiments, the information includes one or more regular expressions that indicate the one or more portions. Alternatively or additionally, in some embodiments, the information includes one or more JavaScript Object Notation, JSON, Pointers, that indicate the one or more portions.

In some embodiments, the protection policy further indicates, for each of the one or more portions, a type of inter-domain security protection to be applied or removed. In this case, for each of the one or more portions, the type of inter-domain security protection to be applied or removed may comprise confidentiality protection and/or integrity protection.

In some embodiments, the protection policy is included in the message. In these and other embodiments, the method may further comprise receiving the protection policy from network equipment in a path that the message takes from a source of the message to the destination of the message. In other embodiments, the method may further comprise, responsive to receiving the message, transmitting a discovery request to a network repository function, NRF, requesting discovery of the protection policy for protecting the message, and receiving the protection policy in response to the discovery request.

Embodiments herein also include a method performed by network equipment for facilitating protection of a message transmitted between different core network domains of a wireless communication system. The method may comprise obtaining a protection policy. In some embodiments, the protection policy indicates which one or more portions of the message inter-domain security protection is to be applied or removed. For example, in one embodiment, the protection policy includes information indicating to which one or more portions of the content of a field in the message inter-domain security protection is to be applied or removed. Regardless, the method may also comprise transmitting the protection policy. For instance, in some embodiments, the method comprises transmitting the protection policy to network equipment, in one different core network domains, configured to apply inter-domain security protection to, or remove inter-domain security protection from, the one or more portions according to the protection policy.

In some embodiments, the method is performed by network equipment that implements a network repository function, NRF. In this case, the method may further comprise receiving a discovery request requesting discovery of the protection policy for protecting the message, and transmitting the protection policy in response to the discovery request. In other embodiments, the method may be performed by network equipment in a path that the message takes from a source of the message to the destination of the message. In these and other embodiments, the protection policy may be included in the message.

In some embodiments, the message is a Hypertext Transfer Protocol (HTTP) message and the field is an HTTP field. For example, in some embodiments, the HTTP message is an HTTP request message and the field is a path field, and wherein the content of the path field is a request Uniform Resource Identifier, URI.

In some embodiments, the information includes one or more regular expressions that indicate the one or more portions. Alternatively or additionally, in some embodiments, the information includes one or more JavaScript Object Notation, JSON, Pointers, that indicate the one or more portions.

In some embodiments, the protection policy further indicates, for each of the one or more portions, a type of inter-domain security protection to be applied or removed. In this case, for each of the one or more portions, the type of inter-domain security protection to be applied or removed may comprise confidentiality protection and/or integrity protection.

Embodiments herein also include corresponding apparatus, computer programs, and carriers (e.g., non-transitory computer readable mediums). For example, embodiments herein also include network equipment configured for use in one of multiple different core network domains of a wireless communication system. The network equipment comprise communication circuitry and processing circuitry. The processing circuitry may be configured to receive, via the communication circuitry, a message that has been, or is to be, transmitted between the different core network domains. The processing circuitry may also be configured to apply inter-domain security protection to, or removing inter-domain security protection from, one or more portions of the content of a field in the message according to a protection policy that includes information indicating to which one or more portions of the content inter-domain security protection is to be applied or removed. The processing circuitry may further be configured to forward the message, with inter-domain security protection applied or removed to the one or more portions, towards a destination of the message via the communication circuitry.

Embodiments further include network equipment comprising communication circuitry and processing circuitry. The processing circuitry is configured to obtain a protection policy that includes information indicating to which one or more portions of the content of a field in a message inter-domain security protection is to be applied or removed, wherein the message is to be transmitted between different core network domains of a wireless communication system. The processing circuitry is also configured to transmit the protection policy via the communication circuitry.

DETAILED DESCRIPTION

Figure 1:
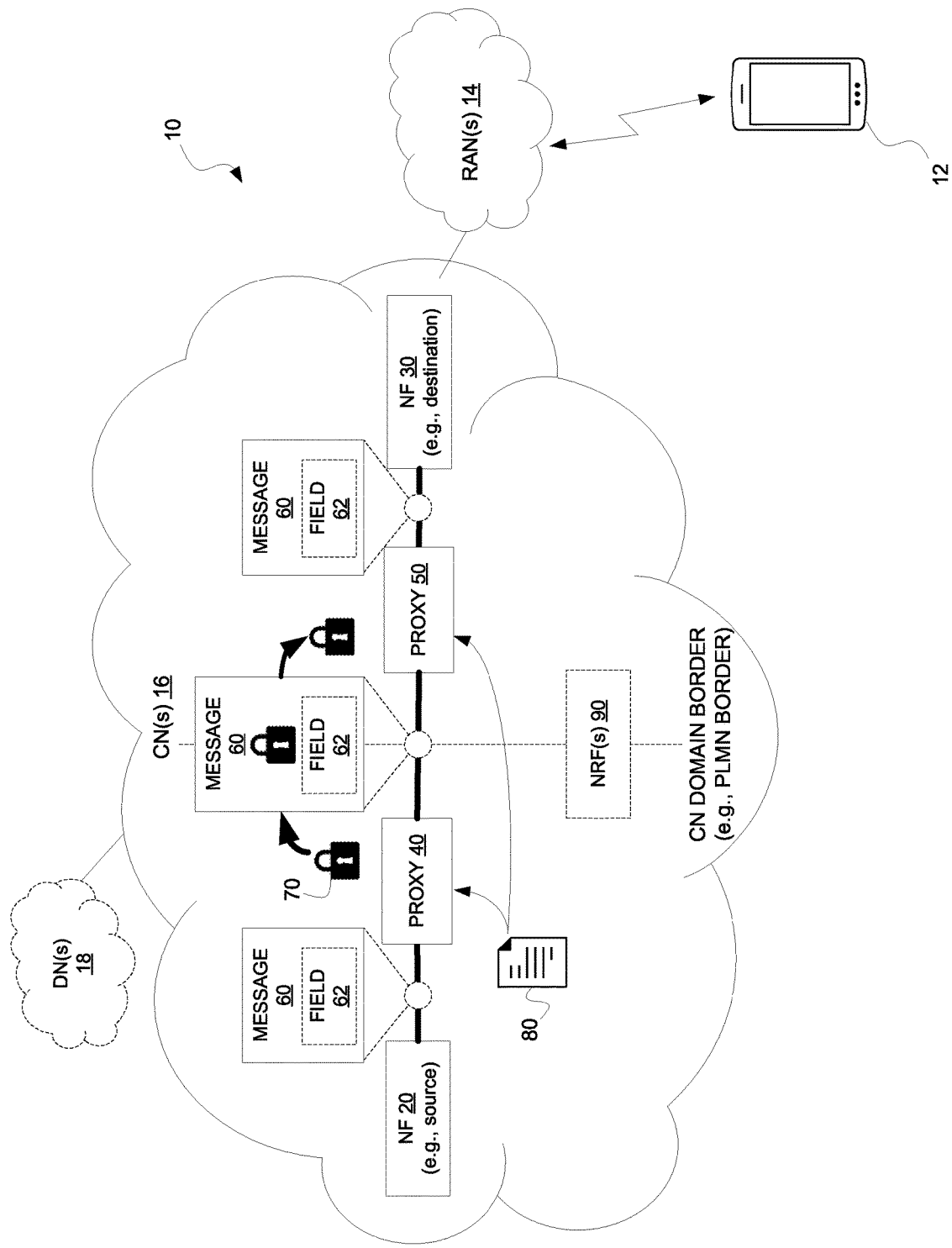
FIG. 1 is a block diagram of a wireless communication system according to some embodiments.

FIG. 1 shows a wireless communication system 10 according to some embodiments. The system 10 includes one or more radio access networks (RANs) 14 that wirelessly connect wireless devices 12 to one or more core networks (CNs) 16, e.g., of one or more public land mobile networks (PLMNs). The CN(s) 16 in turn connect the wireless devices 12 to one or more data networks 18, e.g., the Internet, a public switched telephone network (PSTN), etc.

The CN(s) 16 in some embodiments have a service-based architecture that leverages service-based interactions between CN network functions (NFs), two of which are shown as NFs 20, 30. Each NF 20, 30 may be implemented by network equipment either as a network element on dedicated hardware, as a software instance running on dedicated hardware, or as a virtualized function instantiated on an appropriate platform, e.g., on a cloud infrastructure. Where the system 10 is a 5G system, for instance, NFs in the control plane may include an access and mobility management function (AMF), a session management function (SMF), a policy control function (PCF), an authentication server function (AUSF), a unified data management (UDM) function, etc.

An NF may provide its services to other authorized NFs that consume those services. An NF may thereby take on a provider role as a provider of a service (NF service provider) and/or a consumer role as a consumer of a service (NF service consumer). In one example, NF 20 operates as NF service consumer to consume services provided by NF 30 as NF service provider. Regardless, as part of, or in order for, an NF service provider to provide its services to an NF service consumer, the NFs 20, 30 exchange communication in the form of messages. In some embodiments, though, the NFs 20, 30 are in different PLMNs. In these and other embodiments, then, these messages must be transmitted between different core network domains.

FIG. 1 shows that proxies 40, 50 facilitate inter-domain messaging. Each proxy 40, 50 is configured as a proxy for a respective core network domain. Where the NFs 20, 30 are in different PLMNs, for instance, the proxies 40, 50 may be edge proxies (e.g., in the form of security edge protection proxies, SEPPs) at the edge of a respective PLMN. Each proxy 40, 50 intercepts messages (e.g., at an application layer) that are incoming to and/or outgoing from that domain, e.g., to inspect and/or filter the messages (e.g., for maliciousness), to perform load balancing, or the like. The proxies 40, 50 in some embodiments hide the topology of their respective core network domain. The proxies 40, 50 also protect the messages transmitted between the core network domains.

More particularly in this regard, FIG. 1 shows as an example that NF 20 is the source of a message 60 (e.g., an application layer message) to be transmitted to NF 30 as the destination of the message 60. With NFs 20, 30 in different core network domains, proxy 40 receives (e.g., intercepts) the message 60 before the message 60 is transmitted across the core network domain border. Proxy 40 applies inter-domain security protection 70 to the message 60. Where the protection 70 includes confidentiality protection, for example, application of the protection 70 may involve encryption. Alternatively or additionally, where the protection 70 includes integrity protection, application of the protection 70 may involve addition of a checksum, Message Authentication Code (MAC), signature, or other information for detecting message tampering. In any event, proxy 40 then forwards the message 60, with protection 70 applied, towards NF 30 as the message's destination 30. Proxy 50 receives (e.g., intercepts) the message 60 incoming to the core network domain of NF 30. Proxy 50 removes the inter-domain security protection 70 (e.g., by performing decryption and/or checksum confirmation and removal). Proxy 50 then forwards the message 60 towards NF 30 as the message's destination 30.

According to some embodiments, inter-domain security protection 70 is applied to one or more portions or parts of the message 60, e.g., such that protection may be applied selectively to only certain portions of the message 60 rather than having to be applied to the message 60 as a whole. In fact, in some embodiments, protection 70 is applied to one or more portions of the content of a certain field 62 in the message 60. Field 62 in this regard may be predefined (e.g., based on the protocol according to which the message 60 is generated) as having content of a certain type and/or purpose. Field 62 in some embodiments may also be referred to as an element or information element. In this way, protection may be applied selectively to certain portion(s) of a given field's content, rather than the field's content as a whole.

Figure 2A:
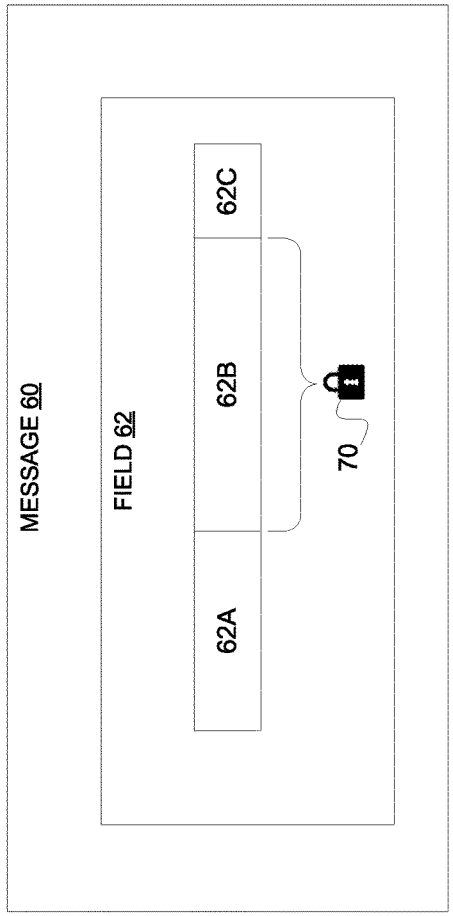
FIG. 2A is a block diagram of a field in a message to which inter-domain security protection is applied according to some embodiments.

FIG. 2A shows an example. As shown in FIG. 2A, the content of the field 62 has multiple portions 62A, 62B, and 62C. These portions may all have the same type and/or purpose so as to together form the field's content. But protection 70 may be applied selectively to portion 62B, to the exclusion of portions 62A and 62C. In some embodiments, for example, proxy 50 extracts portion 62B from the field 62 and applies protection 70 selectively to the extracted portion 62B (e.g., by selectively encrypting portion 62B and/or generating a checksum selectively for portion 62B). Portions 62A and 62C may remain unprotected. Proxy 60 upon receipt of the message 60 may in turn extract portion 62B from the field 62 and remove protection 70 selectively from the extracted portion 62B (e.g., by selectively decrypting portion 62B and/or confirming and removing the checksum for portion 62B).

Figure 2B:
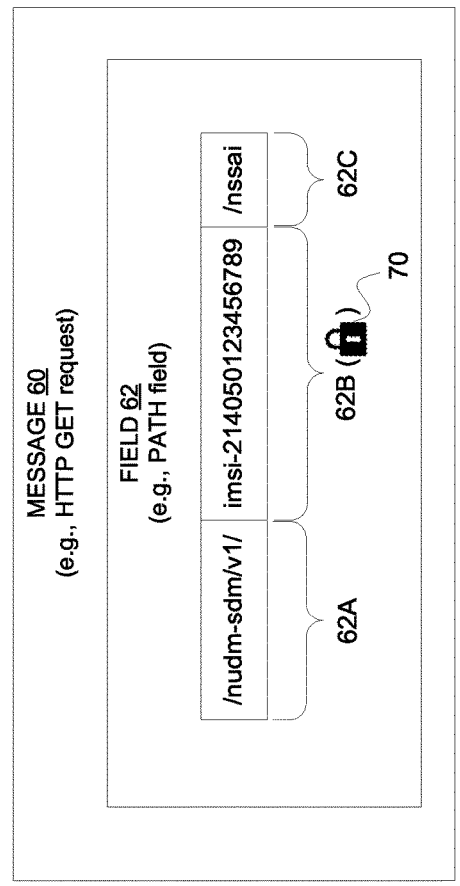
FIG. 2B is a block diagram of example content of a field in a message to which inter-domain security protection is applied according to some embodiments.

FIG. 2B illustrates a specific example of the field's content in some embodiments where the message 60 is a HyperText Transfer Protocol (HTTP) message and the field 62 is an HTTP field (e.g., a body or a part of the body of the HTTP message, or a field in an HTTP header or pseudo header). As shown, the message 60 is an HTTP GET request and the field 62 is a PATH field. The content of the PATH field is a request Uniform Resource Identifier (URI). In this case, then, protection 70 may be applied to one or more portions of the request URI in the PATH field. Indeed, the content of the PATH field (namely, the request URI) in this example contains multiple portions 62A, 62B, and 62C, with protection 70 selectively applied to only portion 62B of the request URI. Portion 62B in this example includes a subscriber identifier in the form of an International Mobile Subscriber Identifier (IMSI). Other portions 62A and 62C may remain unprotected.

Selective inter-domain security protection of certain portions of the message 60 (e.g., one or more portions of field 62's content) according to some embodiments may advantageously safeguard those certain portions against unauthorized inspection and/or tampering, while at the same time enabling entities to read and/or modify other portions. For example, an internetwork exchange provider that provides the connection between different core network domains may read and/or modify unprotected portions as needed to offer services to network operators. The granularity of protection therefore may be narrowly tailored to the granularity of the (e.g., sensitive) content actually needing protection. This avoids overly broad protection that jeopardizes other entities' use of other content and/or that may needlessly increase communication resources or processing power.

Notably, some embodiments herein exploit a protection policy 80 for realizing this selective inter-domain security protection of certain portions of the message 60 (e.g., one or more portions of field 62's content). The protection policy 80 includes information indicating to which one or more portions of the message 60 inter-domain security protection 70 is to be applied (e.g., by proxy 40) or removed (e.g., by proxy 50). In some embodiments, then, this information indicates to which one or more portions of the content of a field 62 inter-domain security protection 70 is to be applied or removed. Note that the information may effectively indicate to which one or more portions protection 70 is to be applied/removed, either explicitly by indicating the portion(s) to which protection 70 is to be applied/removed or implicitly by indicating the portion(s) to which protection 70 is not to be applied/removed. The protection policy 80 in one embodiment also indicates, for each of the one or more portions, a type of inter-domain security protection 70 to be applied or removed (e.g., confidentiality and/or integrity protection).

For example, in some embodiments, the information in the protection policy 80 includes one or more regular expressions that indicate the one or more portions. A regular expression in this regard may be a sequence of characters that defines a search pattern. The search pattern may in turn be used by searching algorithms to find a certain pattern of characters in the message 60 (e.g., in the field's content).

For instance, a regular expression usable to find portion 62B in FIG. 2B (e.g., the IMSI) may be "^/udm-sdm/v1/([^/?#]+)/nssai$". In this example, the circumflex character (namely, ^) and the dollar sign character (namely, $) are anchors that do not "consume" any characters, but instead tie the pattern to the beginning and end of the string being searched. The characters ([^/?#]+) in the regular expression capture any subpattern or subgroup that includes one or more occurrences of any character except the forward slash character (/), the question mark character (?), and the pound character (#). This captured subpattern or subgroup is output from the searching algorithm. Accordingly, parsing the field's content using the regular expression provides the subpattern "imsi-214050123456789". Protection 70 may therefore be selectively applied to only this subpattern, to the exclusion of other portions 62A and 62C of the field's content.

Of course, a regular expression is just one way to indicate a portion as used herein. The protection policy 80 may include any type of expression, pattern, syntax, language, delimiter, pointer, rule, or other information that indicates the one or more portions. For example, in some embodiments, the information may be any information that indicates a pattern, token, or substring inside a broader string. In the example of FIG. 2B, for instance, the information may alternatively indicate portion 62B as the third path segment in the field's content; that is, the subpattern or subgroup of characters occurring between the third and fourth tokens or delimiters in the form of a forward slash (/). In still other embodiments, the information may include one or more ranges of bytes within the field 62, and/or one or more ranges of bits within the field 62, that indicate the one or more portions.

In yet other embodiments, the information in the protection policy 80 includes one or more JavaScript Object Notation, JSON, Pointers, that indicate the one or more portions. A JSON Pointer (e.g., as defined in RFC 6901) is a string syntax for identifying a specific value within a JSON document. A JSON Pointer may be expressed in JSON string values and/or URI fragment identifiers. A JSON Pointer in particular is a Unicode string containing a sequence of zero or more reference tokens. Each token is prefixed by a forward slash '/' character. In these and other embodiments, then, the protection policy 80 as an example may indicate one or more portions of content in the body or payload of an HTML message, where that body or payload includes a JSON document.

No matter the particular nature of the information in the protection policy 80, these examples illustrate that the protection policy 80 in some embodiments indicates the portion(s) (to which protection 70 is to be applied or removed) with information that is agnostic to, independent of, and/or generically applicable to any of the underlying message/field content or the message's transmission protocol. The protection policy 80 may for instance be capable of indicating any portion(s) of content in a field 62 with the same general kind of information (e.g., a regular expression), no matter the type, structure, or formatting of the field's content. That is, in one instance the information may be formed (e.g., as a particular regular expression) to indicate a certain portion of content in the field 62 based on the content having a certain type or format (e.g., an IMSI), but in another instance the information may be formed (e.g., as a different regular expression) to indicate a different portion of content in the field 62 based on the content having a different type or format (e.g., a cell identifier). But the information in both instances has the same general character (e.g., both are regular expressions), so as to universally enable the proxies 40, 50 to identify any portion(s) without regard to whether or how the type, structure, or format of the underlying content evolves. Accordingly, configuring proxies 40, 50 to generically understand or process regular expressions or other information in the protection policy 80 sufficiently equips the proxies 40, 50 to selectively apply or remove protection 70 to any portion of content in the message 60 or the field 62, even without the proxies 40, 50 being configured to more specifically understand that content. In the example of FIG. 2B, then, a proxy needs to simply understand how to process a regular expression to protect portion 62B, without having to more specifically understand how to identify an IMSI. This means the proxies 40, 50 can remain ignorant of how that underlying content changes or evolves (e.g., in terms of its form or structure), such as in response to the introduction of new entities (e.g., network functions) and/or services (e.g., represented by their HTTP URIs) to the system 10. In some embodiments, then, it is the information in the protection policy 80 (e.g., the regular expressions) that dynamically changes or evolves to account for changes or evolution to the underlying content of the message (e.g., in terms of its structure or format), rather than the proxies' general configuration to identify portion(s) using that kind of information.

Alternatively or additionally to the embodiments above, a protection policy 80 for inter-domain security protection 70 of a message 60 may be dynamically received and/or updated by the proxy 40 or 50. The dynamic retrieval and/or updated of the policy 80 may account for changes or evolution to the content of the message 60. This way, configuration of the proxy 40 or 50 itself does not need be (manually) updated to account for such change or evolution. According to some embodiments, this may advantageously provide flexible protection that evolves along with message formatting changes (e.g., attributable to the evolution of network functions or service in the core network), while minimizing or at least reducing administrative and/or operational overhead that would otherwise be required for such flexibility.

Figure 3:
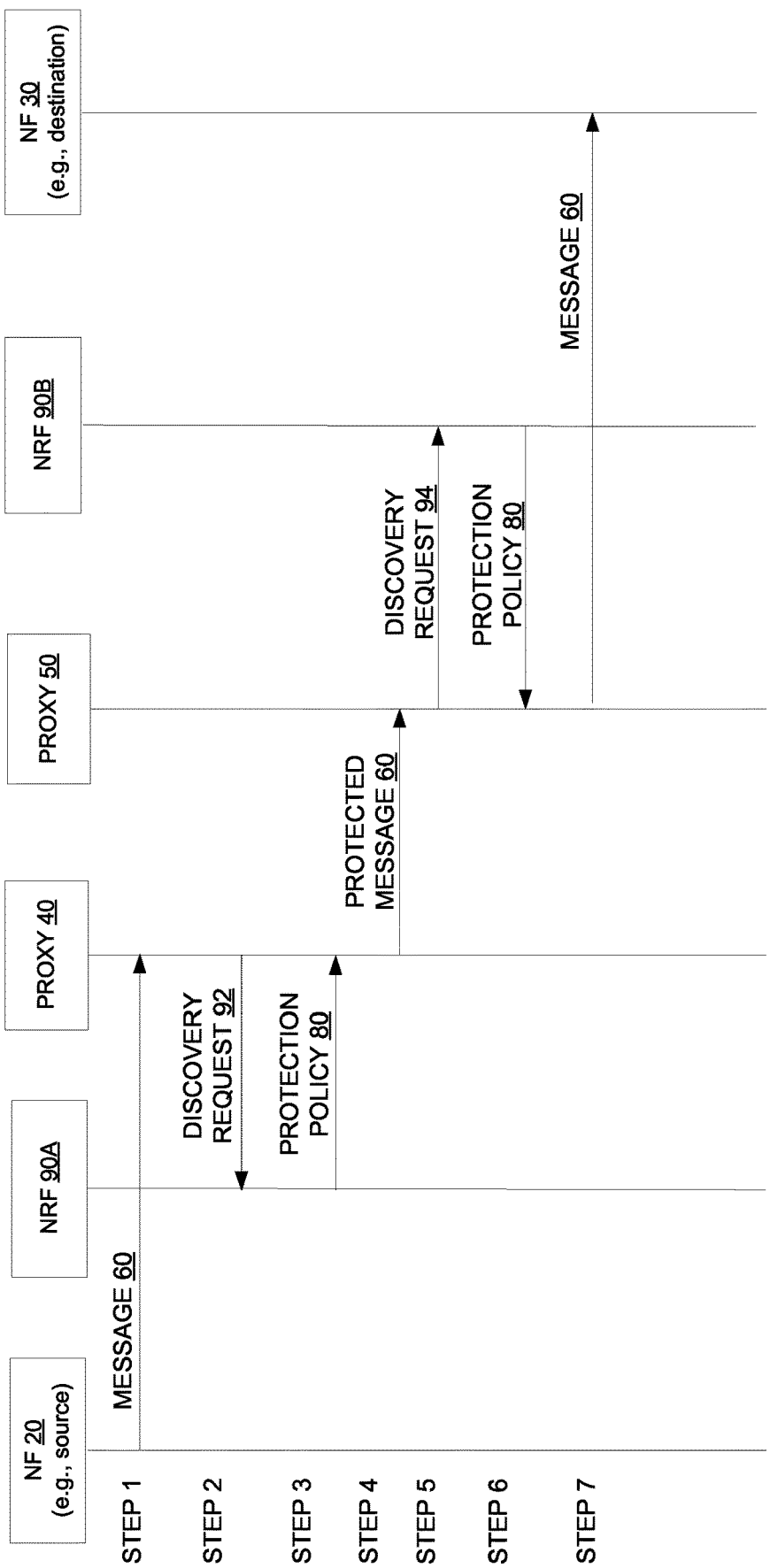
FIG. 3 is a call flow diagram of a process for one or more proxies to obtain a protection policy according to some embodiments.

FIG. 3 for example illustrates some embodiments where the proxy 40 and/or 50 dynamically discovers the protection policy 80 from one or more network repository functions (NRFs) 90, e.g., responsive to receiving the message 60. As shown, NF 20 as the source of the message 60 transmits the message 60, which is intercepted by or otherwise received by proxy 40 (Step 1). In response to receiving the message 60, proxy 40 transmits a discovery request 92 to a discovery service (in its core network domain) requesting discovery of the protection policy 80 for protecting the message 60 (Step 2). The discovery service is shown here as being implemented by a network repository function, NRF, 90A but in other embodiments may be implemented by a standalone function co-located with the NRF or by other network equipment or functions. Regardless, the proxy 40 receives the protection policy 80 in response to the discovery request (Step 3). The proxy 40 applies protection to one or more portions of the message 60 (e.g., one or more portions of the content of field 62) determined according to the protection policy 80 and transmits the protected message 60 across the core network domain border to proxy 50 (Step 4). In response to receiving the message 60, proxy 50 in turn transmits a discovery request 94 to a discovery service (in its core network domain), shown as being implemented by NRF 90B (Step 5). In response to the discovery request, proxy 50 receives the protection policy 80 from the discovery service (Step 6). The proxy 50 removes protection from the one or more portions of the message 60 (e.g., one or more portions of the content of field 62) determined according to the protection policy 80 and transmits the (unprotected) message 60 towards NF 30 as the message's destination (Step 7).

Although not shown, in some embodiments, the source and/or destination of the message provides the protection policy 80 applicable for the message 60 to the discovery service in one or more of the core network domains, e.g., for later discovery of that policy 80 as shown in FIG. 3. For example, where NF 30 is a provider NF that provides a service to NF 20 as a consumer NF, and the message 60 is a message that NF 20 sends to NF 30 for consuming that service, NF 30 as the provider NF in some embodiments provides its service profile to the NRF 90B (e.g., as part of initial registration or registration update), including the protection policy 80 applicable for one or more messages used for consuming a service provided by NF 30. The NRF 90B may in turn distribute or otherwise provide the service profile or at least the protection policy 80 to NRF for later discovery by potential consumer NFs.

In yet other embodiments, though, the proxy 40 and/or 50 may subscribe to proactively receive new or updated protection policies from the NRF 90A and/or 90B. In these and other embodiments, proxy 40 and/or 50 may store (e.g., cache) received protection policies in anticipation of later use for protecting messages transmitted between the core network domains.

Figure 4:
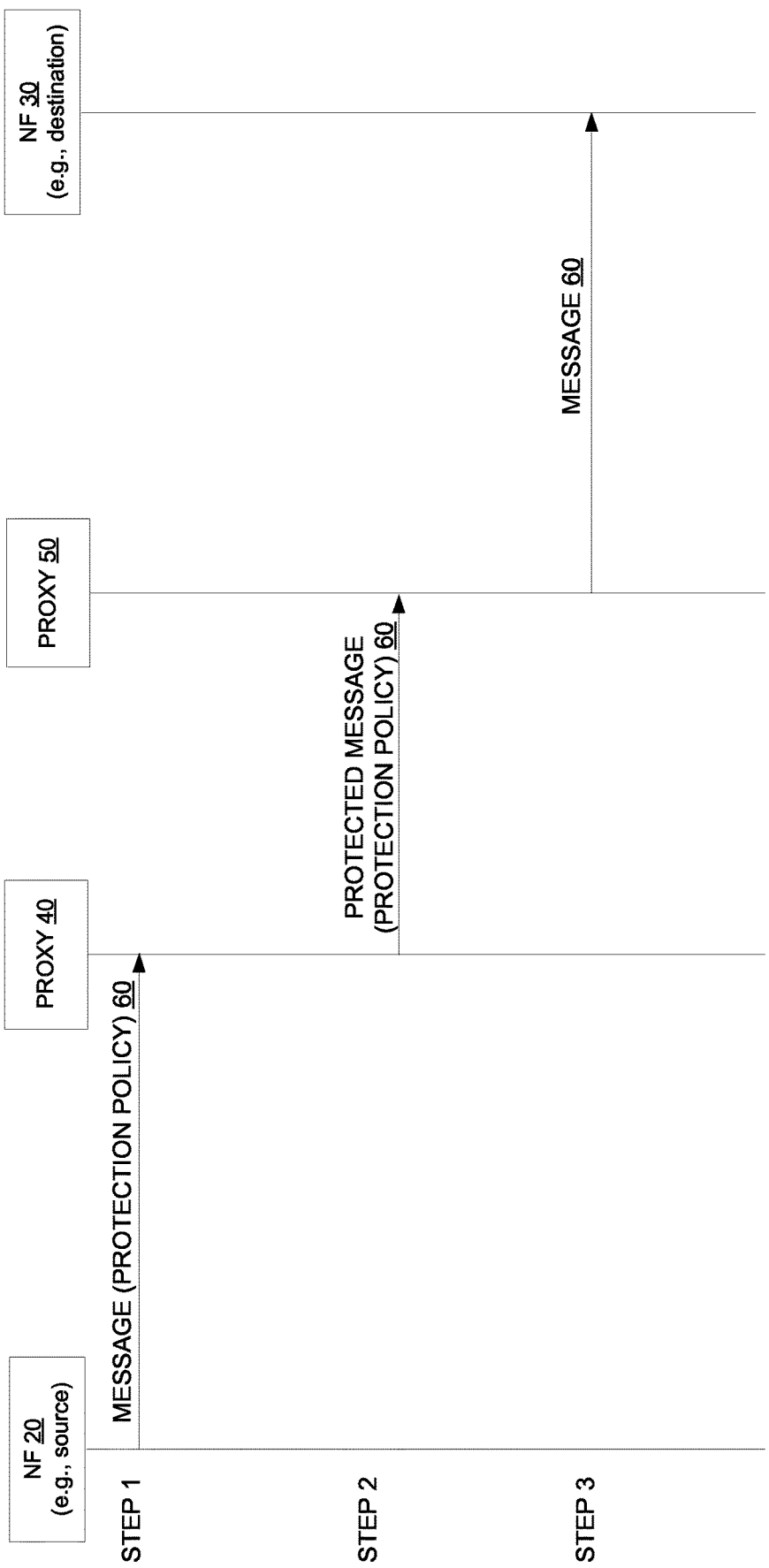
FIG. 4 is a call flow diagram of a process for one or more proxies to obtain a protection policy according to other embodiments.

FIG. 4 by contrast shows other embodiments where proxy 40 and/or 50 receives the protection policy 80 from network functions or equipment in a path that the message 60 takes from the source to the destination of the message 60. In particular, FIG. 4 shows that NF 20 as the message source transmits the message 60 with the protection policy 80 embedded or otherwise included in the message 60 itself (e.g., in a header of the message) (Step 1). In this way, proxy 40 receives the protection policy 80 from the source of the message 60. Proxy 40 then transmits the protected message 60 across the core network domain border, again with the protection policy 80 included in the message 80 (Step 2). Proxy 50 accordingly receives the protection policy 80 from proxy 40 in a different core network domain. Proxy 50 may then remove protection of the message 60 and forward it on towards NF 30 as the destination (Step 3).

Figure 5:
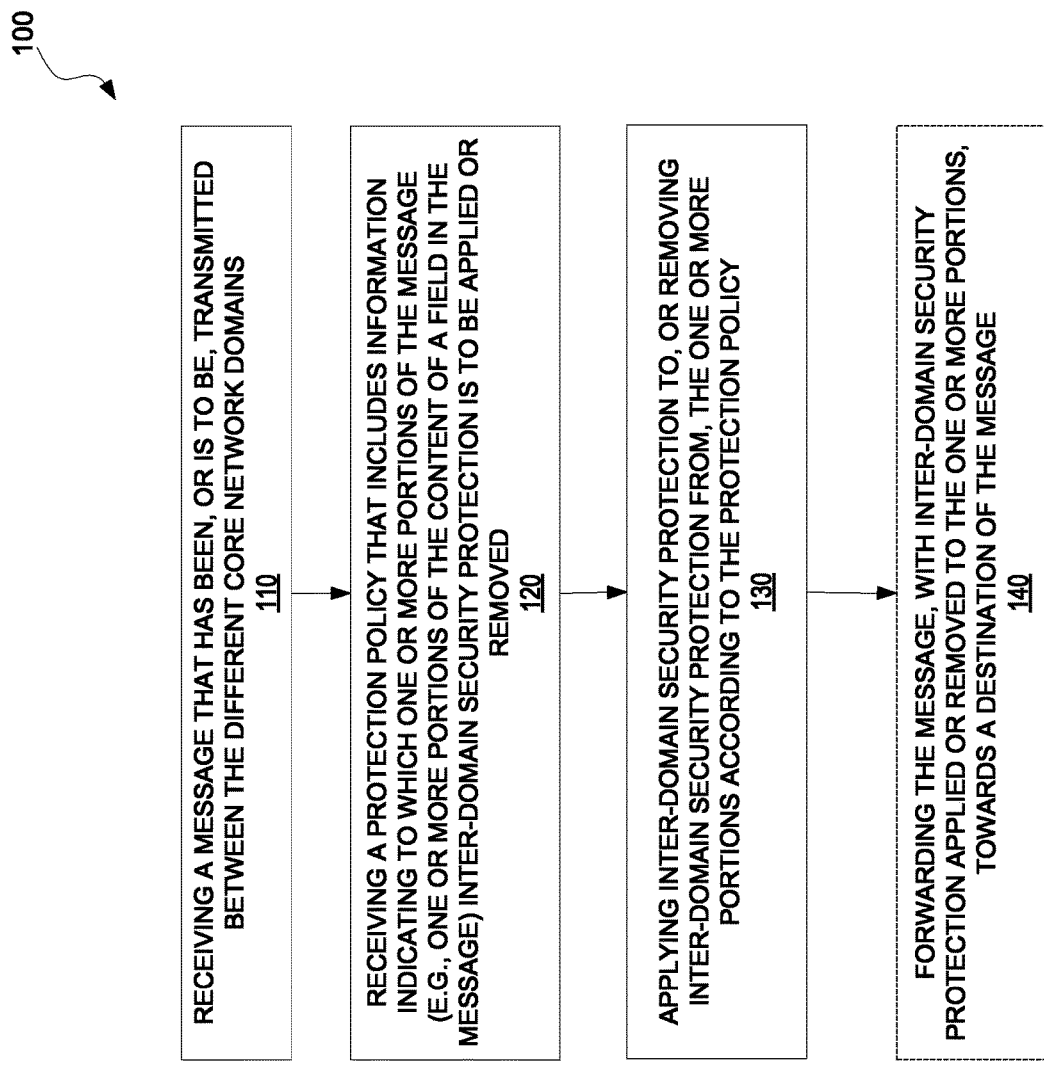
FIG. 5 is a logic flow diagram of a method performed by network equipment according to some embodiments.

In view of the above variations and modifications, network equipment in some embodiments generally performs the method 100 shown in FIG. 5. The network equipment may be configured as a proxy for one of multiple different core network domains of a wireless communication system 10. For example, the method 100 may be performed by network equipment configured as proxy 40 or proxy 50. The method 100 as shown includes receiving a message 60 that has been, or is to be, transmitted between the different core network domains (Block 110). The method 100 may also include receiving a protection policy 80 that includes information indicating to which one or more portions of the message 60 (e.g., one or more portions of the content of a field 62 in the message 60) inter-domain security protection 70 is to be applied or removed (Block 120). The method 100 may further include applying inter-domain security protection to, or removing inter-domain security protection from, the one or more portions according to the protection policy 80 (Block 130). The method 100 in some embodiments may also include forwarding the message 60, with inter-domain security protection applied or removed to the one or more portions, towards a destination of the message 60 (Block 140).

In some embodiments, the method further comprises, responsive to receiving the message transmitting a discovery request to a network repository function, NRF, requesting discovery of the protection policy 80 for protecting the message 60, and receiving the protection policy in response to the discovery request. Alternatively, the method may comprise receiving the protection policy 80 from network equipment in a path that the message takes from a source of the message to the destination of the message.

Figure 6:
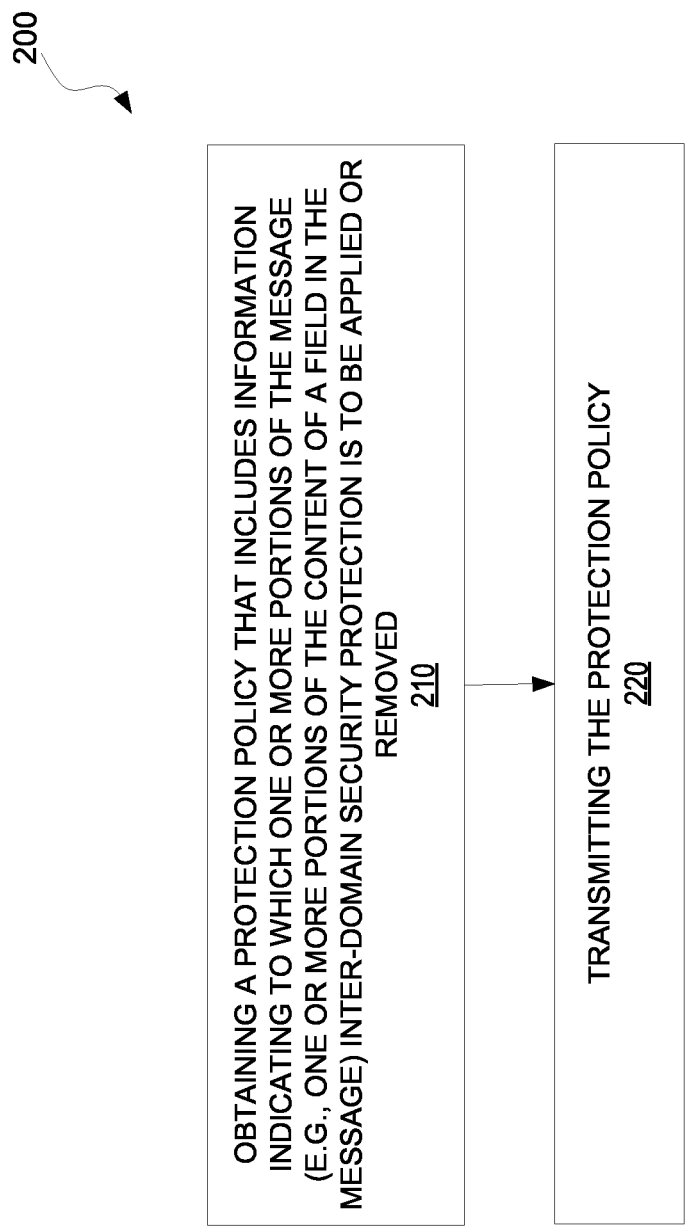
FIG. 6 is a logic flow diagram of a method performed by network equipment according to other embodiments.

Also in view of the above variations and modifications, network equipment in other embodiments generally performs the method 200 shown in FIG. 6 for facilitating protection of a message 60 transmitted between different core network domains of a wireless communication system 10. The method 200 may be performed for example by network equipment implementing NF 20, proxy 40, proxy 50, NF 30, or NRF(s) 90. The method 200 as shown in this regard includes obtaining a protection policy 80 that includes information indicating to which one or more portions of the message 60 (e.g., one or more portions of the content of a field 62 in the message 60) inter-domain security protection 70 is to be applied or removed (Block 210). The method 200 may also include transmitting the protection policy 80 (Block 220).

For example, in some embodiments, transmitting the protection policy comprises transmitting the protection policy to network equipment configured, as a proxy one of the different core network domains, to apply inter-domain security protection to, or remove inter-domain security protection from, the one or more portions according to the protection policy.

Alternatively or additionally, the method may be performed by network equipment that implements a network repository function, NRF, and may further comprise receiving a discovery request requesting discovery of the protection policy for protecting the message, and transmitting the protection policy in response to the discovery request.

Alternatively, the method may be performed by network equipment in a path that the message takes from a source of the message to the destination of the message (e.g., by NF 20, proxy 40, proxy 50, or NF 30).

Some embodiments will now be discussed with particular relevance to their applicable at times to 5G.

3GPP is working on 5G, and its associated Core Network (5GC) that provides services to the connecting users, from authentication to IP address assignment and routing of packets. However, the 5G core network is significantly different from previous generations.

One of the changes in the 5G architecture is to implement a so-called Service-Based Architecture (SBA). In this new architecture, a number of the interfaces within the core network (including roaming interfaces) are changed from legacy telecom-style to modern, web-based application programming interfaces (API)s. The details of these APIs are being currently worked on at 3GPP SA2 group, in the 5G core network architecture document 23.501 and 23.502, as well as in 3GPP CT groups.

There are several alternatives to develop and implement a service-based architecture. Out of several possibilities, the 3GPP CT4 group selected an architecture based on the Representational State Transfer (REST) architectural model. In this model, the different entities (services, network functions, etc.) in the 5G system interact with each other by invoking actions on a so-called "resource", which is identified in HTTP by the Uniform Resource Identifier (URI). Then, the different actions to be invoked in the different system entities are defined by the different HTTP standard commands (e.g., GET, POST, PUT, DELETE, etc. . . . ), while the HTTP messages convey representations of the affected resources in the HTTP payload. These representations can be formatted in different data-encoding languages (e.g. JSON).

The 5G Core Network may follow these requirements: Main protocol: HTTP/2; Transport protocol: TCP; RESTful API design style; Data serialization format: JSON; Server-initiated interactions: "Web-hook"; and Interface Definition Language: OpenAPI 3.0.0 (formerly known as "Swagger").

The different Network Functions in the 5G Core Network expose their services via an Application Programming Interface (API). This API defines the HTTP resources (Universal Resource Identifiers, URIs), the allowed operations (GET, POST, PUT, . . . ) and the format of the data transported in the message payload (message body).

Unless the information regarding NF service providers is locally configured on the corresponding NF service consumers (this may be the case if the expected NF service or NF is in the same PLMN as the requester NF), NF service consumers discover and select NF service producers dynamically using a Network Repository Function, NRF. The NRF is the logical function that is used to maintain the NF profile of available instances of NF service producers and their supported services, receive NF service Discovery Requests from NF service consumers, and provide the information of the available instances of corresponding NF service producers to the requesting NF service consumer.

In order to enable access to a requested NF type or NF service, the requester NF initiates the NF or NF service discovery by providing the type of the NF or the specific service it is attempting to discover (e.g. session management function, SMF, policy charging function, PCF, user equipment, UE, location Reporting) and other service parameters (e.g. slicing related information) to the NRF. Depending on the chosen message routing model, the NRF may provide the IP address or the fully qualified domain name (FQDN) or the identifier of the relevant services and/or NF instance(s) to the requester NF. Based on that information, the requester NF can select one specific NF instance or an NF instance that is able to provide a particular NF Service (e.g., an instance of the PCF that can provide Policy Authorization).

In the cases of roaming (i.e., when the user is accessing a network other than his or her home network, where the user has his/her subscription), the communication may be protected (e.g., cryptographically) between the visited network and the home network, to ensure that the information sent over the interconnecting networks is not inspected or modified by unauthorized parties. This task is done by a network element called SEPP (Security Edge Protection Proxy). There may be a vSEPP (the SEPP in the visited network) and a hSEPP (the SEPP in the home network) that communicate over an N32 interface.

Protection of communication between the SEPPs may be at the application layer. In some embodiments, integrity protection applies to all attributes transferred over the N32 interface. Alternatively or additionally, one or more of the following attributes may be confidentiality protected when being sent over the N32 interface: Authentication Vectors; Cryptographic material; Location data, e.g. Cell ID and Physical Cell ID; or subscriber permanent identifier (SUPI) such as International Mobile Subscriber Identifier (IMSI).

As part of the functions of the SEPP, one of them is to protect the information sent on the different fields that compose the HTTP messages. These HTTP fields can be, for example, the HTTP request URI, the HTTP headers, and different parts of the HTTP body (or payload).

The connection between two PLMNs is usually done via so-called IPX providers. Besides the actual connection, IPX providers also usually offer additional services to the operators. Some of these services are based on reading and/or changing fields in the messages sent between PLMNs. Hence it is desirable that certain message portions or fields are actually not cryptographically protected when sent over the N32 interface between the vSEPP and the hSEPP.

Summarizing, the SEPP should protect (encrypt and/or integrity protect) some of the information fields or parts in the messages sent on the N32, and some other parts of the messages the SEPP should to leave unprotected, e.g., for realizing additional services provided by IPX providers.

However, if a new type of message is sent over the N32 that was not defined at roll-out or last update of the SEPP, the parts of the message that need to be protected are not explicitly known to the SEPP. Yet it is desirable that the SEPP be able to provide its services without requiring a software upgrade as a result of the usual functional evolution of the different Network Functions in the Core Network.

Some embodiments herein advantageously provide a policy that defines which parts of a message need to be protected, and in which way they must be protected (confidentiality, integrity). In one or more embodiments, this policy is expressed in a language or "mask" that is (pattern matching) applicable for new types of messages. In this way, the policy can be expressed dynamically and does not need to be known at rollout or last update of the SEPP. Embodiments herein also include flows for informing the SEPP of the policy applicable for a specific message. Embodiments thereby provide a dynamic and flexible way to protect selectively parts of the messages sent on N32, in such a way that the entities performing such protection (encryption and/or integrity protection) are not dependent on static configuration and do not need to be changed when new entities (Network Functions) and new services (represented by their HTTP URIs) are added to the system.

Some embodiments allow application of a security mechanism without affecting the design (API) of the services between home and visited PLMNs. Additionally or alternatively, some embodiments allow protection (encryption and/or integrity protection) of sensitive information elements (such as user identities, like IMSI) found in HTTP messages in 5G traffic transported between network operators in a flexible way, not bound to the current definition of service APIs, and prepared for the introduction of new network functions, services and APIs in further evolution of the 5G Core Network.

Figure 7:
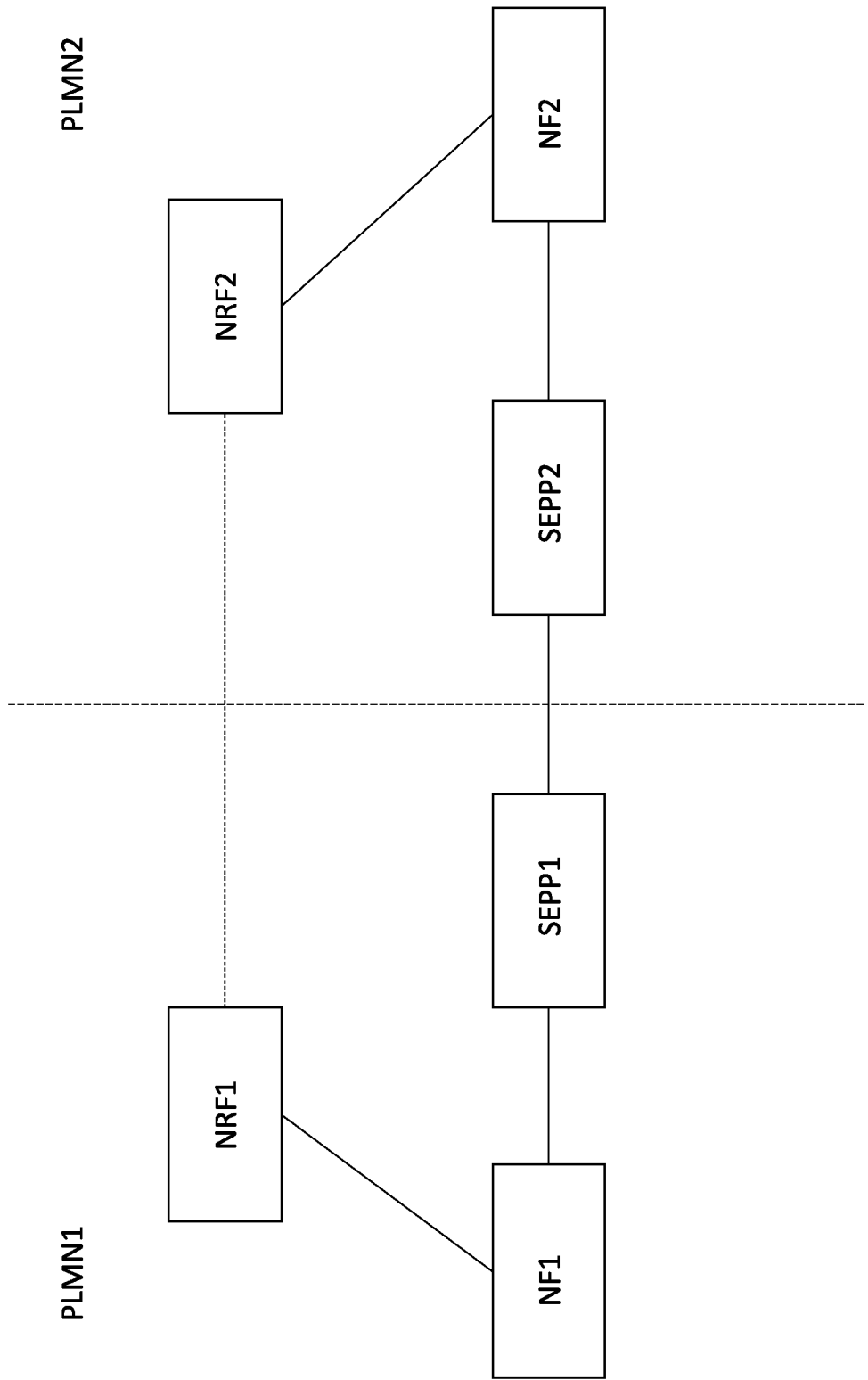
FIG. 7 is a block diagram of a wireless communication system according to some embodiments.

Two variants are discussed below for examples of signaling flows for informing the SEPP of the policy for a specific message. FIG. 7 shows an example context for discussing variants 1 and 2.

In variant 1, the SEPP queries the NRF for applicable protection policy information. As shown, network function NF1 in a PLMN1 intends to send a message to a network function NF2 in a PLMN2. The message is routed via SEPP1 and SEPP2 in PLMN1 and PLMN2. When the SEPP1 receives the message, it checks whether it has stored a protection policy for this type of message which has not expired yet. If no such protection policy is available, SEPP1 queries the NRF in PLMN1 (called NRF1).

If NRF1 was queried by SEPP1 about protection policies applicable to the specific message, NRF1 sends the available protection policies to SEPP1. NRF1 may need to query NRF2, the NRF in PLMN2. NRF1 may have received the protection policies from NF1 at registration. NRF2 may have received the protection policies from NF2 at registration.

Before forwarding the message to SEPP2, SEPP1 performs protection (e.g., cryptographic protection) of the message according to the policy received from NRF1 and/or NRF2. SEPP1 may include the protection policy in the message it forwards. Note that the "forwarding" SEPP might modify the message or even encapsulate it within another message.

When receiving the message from SEPP1, SEPP2 decrypts the encrypted parts of the message and checks the integrity of the integrity-protected parts of the message. SEPP2 may use the protection policy received from SEPP1 or query NRF1 and/or NRF2 as required to get the protection policy information.

SEPP2 forwards the message to NF2.

In variant 2, by contrast, the NF that sends the message (NF1) includes the protection policy in the message. The NF may have received the policy during service discovery (if it is the service consumer) or during service registration (if it is the service producer).

More particularly in this regard, a network function NF1 performs service discovery or service registration at NRF1, the NRF in its PLMN. As part of the above discovery or registration, the NRF1 may include protection policies of message types that NF1 may send while consuming or producing the service. For the discovery case, NRF1 may have received the protection policy from NRF2.

While consuming or producing the service, NF1 intends to send a message to NF2. The message is routed via SEPP1 and SEPP2. In the message, the NF1 includes the protection policy that is applicable for this message. NF1 may have received the policy from NRF1 or NRF2, but the policy may alternatively originate from NF1 itself.

Before forwarding the message to SEPP2, SEPP1 performs protection of the message according to the policy received from NFL To ensure that SEPP2 is able to retrieve the original message, SEPP1 may include information that allows the SEPP2 to know what parts were protected. This may for example be solved by the SEPP1 including the protection policy in the message it forwards. Again note that the "forwarding" SEPP might modify the message or even encapsulate it within another message.

When receiving the message from SEPP1, SEPP2 decrypts the encrypted parts of the message and checks the integrity of the integrity-protected parts of the message. For example, SEPP2 may use a protection policy received from SEPP1.

SEPP2 forwards the message to NF2.

A protection policy as discussed in these examples describes which elements of a message should be encrypted and which elements should be integrity protected. The policy may describe explicitly which elements should be protected (encrypted and/or integrity protected), or it may describe explicitly which elements should not be protected (not encrypted and/or not integrity protected).

One of the potential realizations of a protection policy is outlined below. A protection policy may be defined for all the messages sent and received by a NF. Messages may be either HTTP requests or HTTP responses.

A protection policy in some embodiments comprises one or more protection rules. Each protection rule consists of: (1) a message type the rule is applicable to, including for instance an HTTP request, HTTP response, or both; (2) a message entity the rule is applicable to, which may be for instance the Request-URI, an HTTP pseudo header, an HTTP header, or the HTTP body; and (3) a match and replace operation. Depending on the message entity, the operation may be represented by a regular expression, a JSON Pointer (RFC 6901) to an element in a JSON structure and its replacement, or any other expression.

In some embodiments, a protection rule shall exist within the protection policy for every item of every message that requires to be protected.

In a communication between two NFs, a single protection policy may be used in some embodiments. This protection policy may be defined by the NF providing the service (i.e. the called NF). The protection policy may be applicable to the messages sent and received by the NF. The protection policy for a NF may be stored in the NRF located in the PLMN of the NF providing the service.

A protection policy may be used for the NF communication with several PLMNs, but it may also be possible to define protection policies individually for each PLMN the NF interacts with.

The protection policy for the NFs in a given PLMN may be common to all NF service consumers the NF providing the service interacts with.

A SEPP, when encrypting a message sent to an NF, shall iterate over the protection rules of the protection policy for that NF. For every policy rule, if the message type of the rule matches the message type of message, it shall apply the corresponding match and replace operation over the message entity determined by the rule.

A SEPP, when decrypting a message received from another SEPP shall iterate over the protection rules of the protection policy for the receiving NF. For every policy rule, if the message type of the rule matches the message type of message, it shall apply the reverse match and replace operation over the message entity determined by the rule.

The encryption and decryption process finishes when all the protection rules of the protection policy have been evaluated.

Depending on the applicable variant, the applicable protection policy may be either provided to the SEPP (by the NF or the SEPP in the other PLMN) or looked up by the SEPP in the NRF.

In some embodiments, the protection policy may be provisioned local to the NF and in the NRF. For the latter case, a protection policy may be registered in the NRF for each NF. This may be done by the NF as part of its register process with the NRF, or by a different mechanism, such as Operations and Maintenance (O&M) provisioning. In both cases, the goal is to prevent the SEPP from requiring an upgrade when new NFs or changes in the protection policy of existing NFs are deployed.

Figure 8:
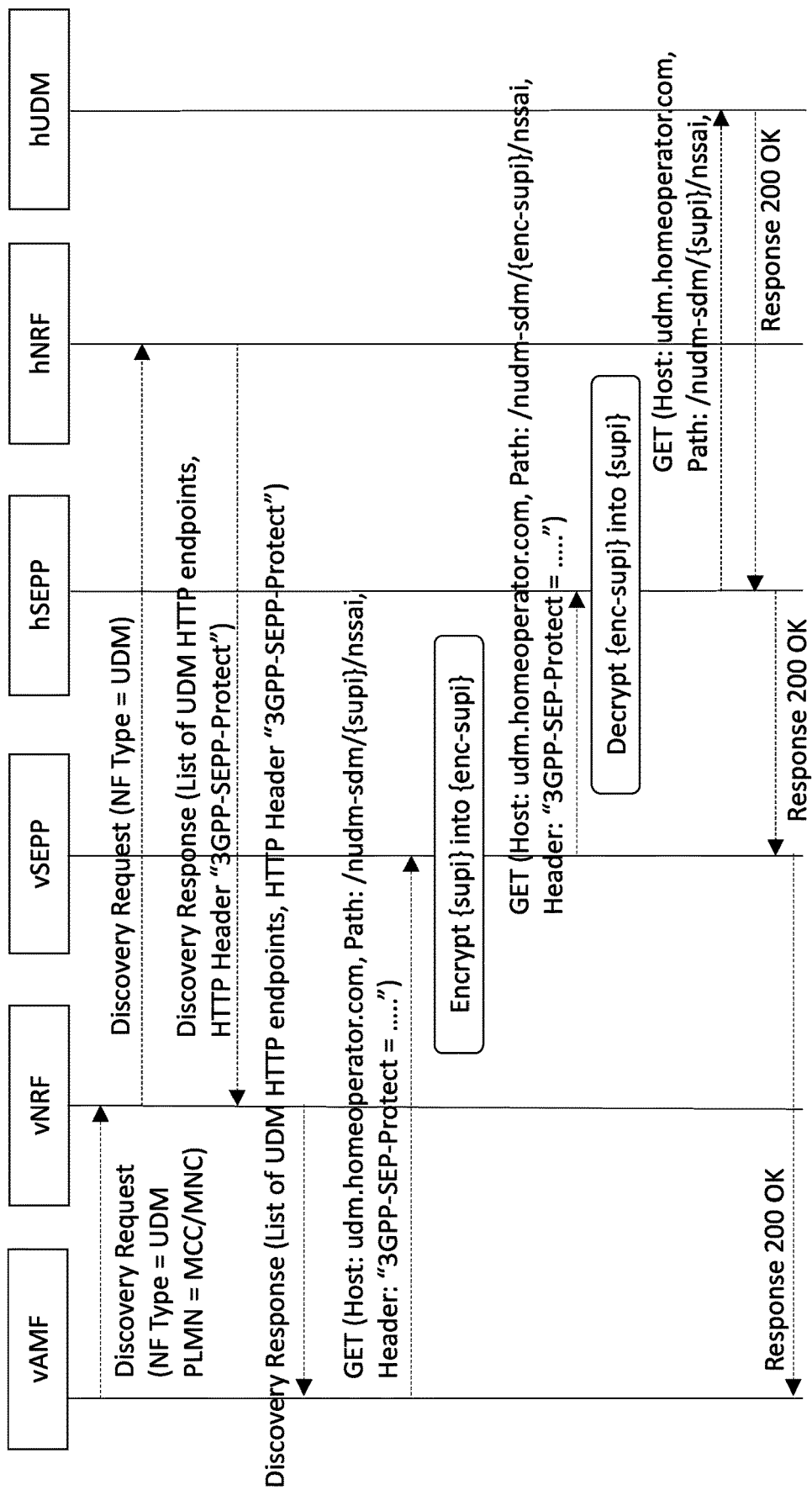
FIG. 8 is a call flow diagram of a process for protecting a message transmitting between core network domains according to some embodiments.

A concrete example for Variant 2 is shown in FIG. 8. In this example, a network function in the visited PLMN (e.g. an access and mobility function, AMF) needs to send an HTTP request to a network function in the home PLMN (e.g., a unified data management, UDM, function), to retrieve subscription data of a particular user. The subscription data may be a small part of the subscription profile, such as the required data to select a particular "slice" of the 5G Core Network.

In order to figure out the URI of the UDM (which is located in the home PLMN), the AMF queries the local NRF, by issuing a discovery request message. The discovery request message includes search criteria such as the required network function type (UDM in this case), or the specific service ("nudm-sdm", in this case). The NRF in the vPLMN in turn forwards the discovery request to the NRF in the hPLMN, and as a result a list of available UDM network functions (URI endpoints) in the hPLMN are returned to the vAMF.

As part of the profiles returned of the available UDM instances, the profile information includes parameters indicating the different available URIs in each service. The profile information also includes a protection policy 80 that includes information about where in these URIs there is sensitive information that needs to be protected. Consider an example:

GET http://www.homeoperator.com/nudm-sdm/v1/{SUPI}/nssai In this case, an AMF may use this URI when it needs to retrieve the Network Slice Selection Assistance Information (NSSAI) of a given user stored in the UDM in his/her home network. In the syntax above, the component {SUPI} represent a variable to be substituted by the real user identity, such as, for example:

GET http://www.homeoperator.com/nudm-sdm/v1/imsi-214050123456789/nssai The HTTP request is routed from the AMF to the SEPP in the visited network (vSEPP), and the AMF includes the protection policy 80 in a specific HTTP header, including the information received from NRF about the parts of the URI that need to be protected because they contain sensitive information.

The vSEPP receives the HTTP message. The vSEPP determines the SEPP in the hPLMN (hSEPP), where this information needs to be sent, and checks the relevant roaming agreement to find out the appropriate encryption keys to be used to protect the messages between SEPPs. The vSEPP also extracts the specific HTTP header sent by the AMF, and processes the URI accordingly, so the sensitive URI parts can be encrypted using the keys found. The HTTP header may indicate, for example, the following regular expression (from the URL example above): "^/udm-sdm/v1/([^/?#]±)/nssai$". This allows finding a full match, where the 1st inner group: "([^/?#]+)" is the set of characters where the {supi} value is expected to be found.

The hSEPP receives the HTTP message, and does the reverse operation. It determines the PLMN that is sending the message, to check the applicable roaming agreements, and determine the right encryption keys. Then, it checks the specific HTTP header and determines the parts of the URI that are subject to protection (encrypted), and it decrypts them, and replaces them by the unencrypted version. The hSEPP also removes the HTPP header that indicated the parts of the URI that were encrypted.

Then, the hSEPP forwards the HTTP message to the UDM instance in the HPLMN. This message is identical to the message originated by the vAMF, and therefore the encryption/decryption done between SEPPS, of certain URI components is transparent to the vAMF→hUDM communication.

Although embodiments have been exemplified in a context for transmitting a message 60 between core network domains that take the form of core networks in different PLMNs, embodiments herein are extendable to any type of core network domains. In fact, in some embodiments, the core network domains are different domains within the same core network.

Note further that embodiments herein may use any of one or more communication protocols known in the art or that may be developed, such as IEEE 802.xx, Code Division Multiple Access (CDMA), Wideband CDMA (WCDMA), Global System for Mobile telecommunications (GSM), Long Term Evolution (LTE), WiMax, New Radio (NR), or the like. Accordingly, although sometimes described herein in the context of 5G, the principles and concepts discussed herein are applicable to 4G systems and others.

A wireless device as used herein is any type device capable of communicating with another radio node wirelessly over radio signals. A wireless device may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless device may be referred to as a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, core network equipment in a core network (e.g., equipment that implements an AMF or SMF).

Note that the network equipment as described above may perform any of the processing herein by implementing any functional means or units. In one embodiment, for example, the network equipment comprises respective circuits or circuitry configured to perform the steps shown in FIG. 5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 9A:
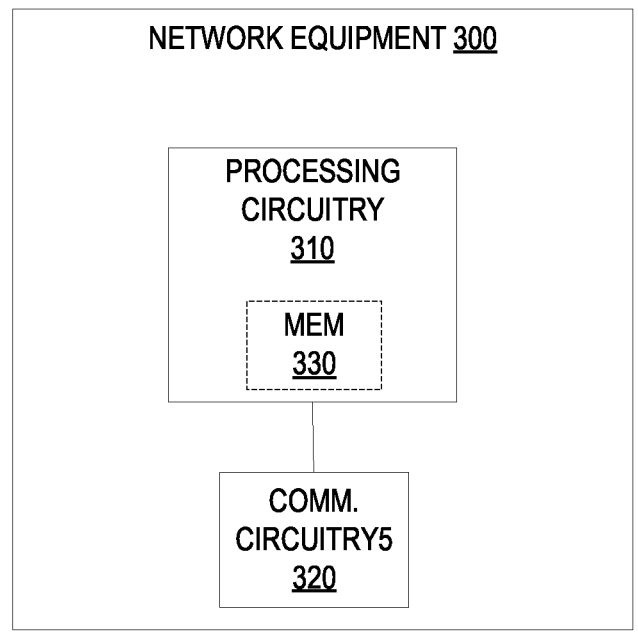
FIG. 9A is a block diagram of network equipment according to some embodiments.

FIG. 9A illustrates network equipment 300 in accordance with one or more embodiments. As shown, the network equipment 300 includes processing circuitry 310 and communication circuitry 320. The communication circuitry 320 is configured to transmit and/or receive information to and/or from one or more other nodes, e.g., via any communication technology. The processing circuitry 310 is configured to perform processing described above, e.g., in FIG. 5, such as by executing instructions stored in memory 330. The processing circuitry 310 in this regard may implement certain functional means, units, or modules.

Figure 9B:
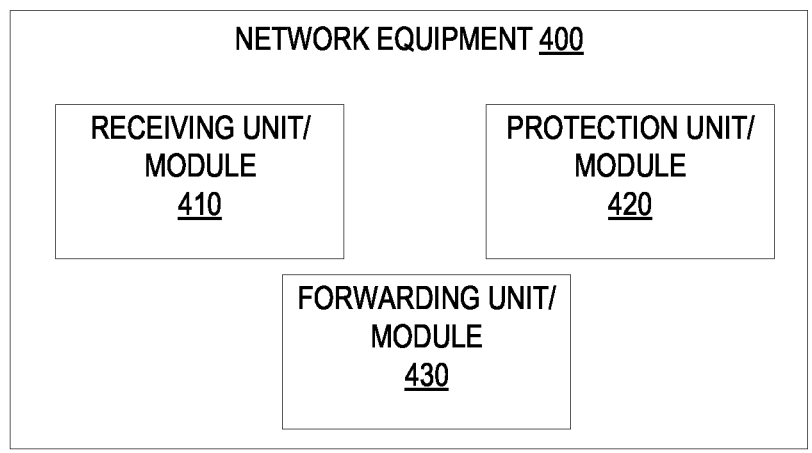
FIG. 9B is a block diagram of network equipment according to other embodiments.

FIG. 9B illustrates network equipment 400 in accordance with one or more other embodiments. As shown, the network equipment 400 implements various functional means, units, or modules, e.g., via the processing circuitry 410 in FIG. 9A and/or via software code. These functional means, units, or modules, e.g., for implementing the method in FIG. 5, include for instance a receiving unit or module 410 for receiving a message 60 that has been, or is to be, transmitted between the different core network domains, and for receiving a protection policy 80 that includes information indicating to which one or more portions of the message 60 (e.g., one or more portions of the content of a field 62 in the message 60) inter-domain security protection 70 is to be applied or removed. Also included may be a protection unit or module 420 for applying inter-domain security protection to, or removing inter-domain security protection from, the one or more portions according to the protection policy 80. Further included in some embodiments may be a forwarding unit or module 430 for forwarding the message 60, with inter-domain security protection applied or removed to the one or more portions, towards a destination of the message 60.

Also note that the other network equipment as described above may perform any of the processing herein by implementing any functional means or units. In one embodiment, for example, network equipment comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 10A:
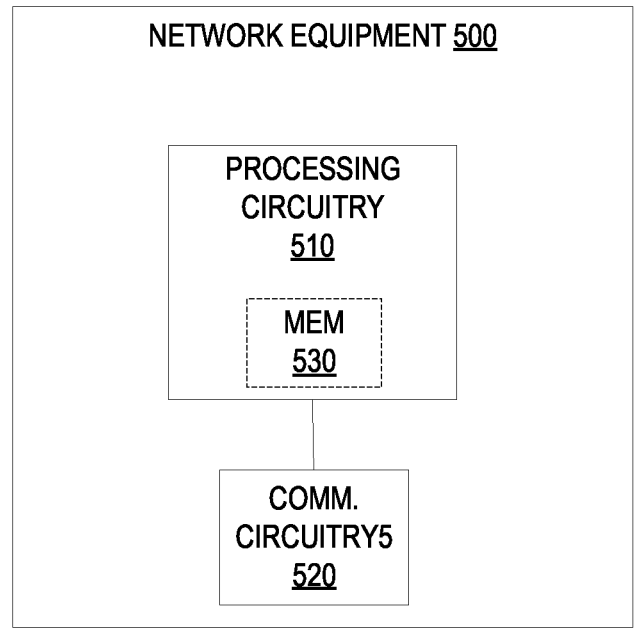
FIG. 10A is a block diagram of network equipment according to still other embodiments.

FIG. 10A illustrates network equipment 500 in accordance with one or more embodiments. As shown, the network equipment 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 6, such as by executing instructions stored in memory 530. The processing circuitry 510 in this regard may implement certain functional means, units, or modules.

Figure 10B:
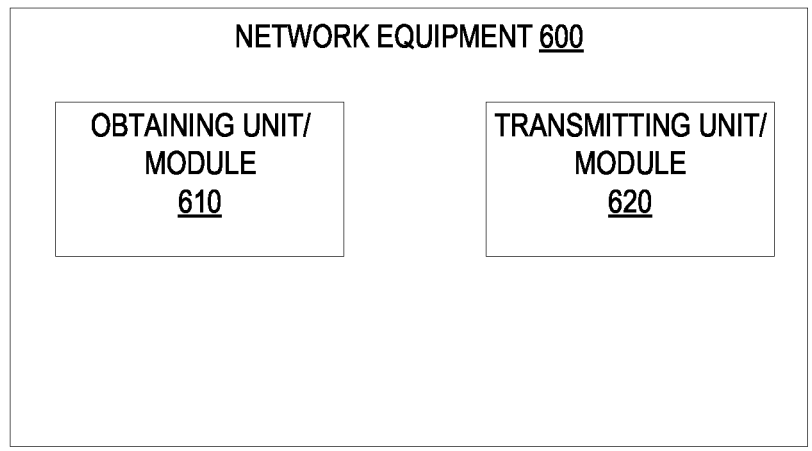
FIG. 10B is a block diagram of network equipment according to yet other embodiments.

FIG. 10B illustrates network equipment 600 in accordance with one or more other embodiments. As shown, the network equipment 600 implements various functional means, units, or modules, e.g., via the processing circuitry 610 in FIG. 10A and/or via software code. These functional means, units, or modules, e.g., for implementing the method in FIG. 6, include for instance an obtaining unit or module 410 for obtaining a protection policy 80 that includes information indicating to which one or more portions of the message 60 (e.g., one or more portions of the content of a field 62 in the message 60) inter-domain security protection 70 is to be applied or removed. Further included may be a transmitting unit or module 420 for transmitting the protection policy 80.

Those skilled in the art will also appreciate that embodiments herein further include corresponding computer programs.

A computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a non-transitory computer readable (storage or recording) medium that has stored thereon instructions that, when executed by a processor of a network equipment, cause the network equipment to perform as described above.

In view of the above, some embodiments will be enumerated below as examples.

Embodiment 1. A method performed by network equipment configured as a proxy for one of multiple different core network domains of a wireless communication system, the method comprising: receiving a message that has been, or is to be, transmitted between the different core network domains; receiving a protection policy that includes information indicating to which one or more portions of the content of a field in the message inter-domain security protection is to be applied or removed; applying inter-domain security protection to, or removing inter-domain security protection from, the one or more portions according to the protection policy; and forwarding the message, with inter-domain security protection applied or removed to the one or more portions, towards a destination of the message.

Embodiment 2. The method of embodiment 1, wherein the information includes one or more regular expressions that indicate the one or more portions.

Embodiment 3. The method of embodiment 1, wherein the information includes one or more JavaScript Object Notation, JSON, Pointers, that indicate the one or more portions.

Embodiment 4. The method of embodiment 1, wherein the information includes one or more ranges of bytes within the field, and/or one or more ranges of bits within the field, that indicate the one or more portions.

Embodiment 5. The method of embodiment 1, wherein the information includes one or more search patterns, one or more tokens, and/or one or more substrings, that indicate the one or more portions.

Embodiment 6. The method of any of embodiments 1-5, further comprising extracting the one or more portions of the content of the field for applying or removing inter-domain security protection, by parsing the content using the information included in the protection policy.

Embodiment 7. The method of any of embodiments 1-6, wherein the protection policy further indicates, for each of the one or more portions, a type of inter-domain security protection to be applied or removed.

Embodiment 8. The method of any of embodiments 1-7, wherein, for each of the one or more portions, the inter-domain security protection to be applied or removed comprises confidentiality protection and/or integrity protection.

Embodiment 9. The method of any of embodiments 1-8, wherein the message is a Hypertext Transfer Protocol (HTTP) message and the field is an HTTP field.

Embodiment 10. The method of embodiment 9, wherein the HTTP message is an HTTP request message and the field is a path field, and wherein the content of the path field is a request Uniform Resource Identifier, URI.

Embodiment 11. The method of embodiment 9, wherein the field is a field of an HTTP header or an HTTP pseudo header.

Embodiment 12. The method of embodiment 9, wherein the field is a body, or a part of the body, of the HTTP message.

Embodiment 13. The method of any of embodiments 1-12, further comprising transmitting a discovery request to a discovery service requesting discovery of the protection policy for protecting the message, and receiving the protection policy in response to the discovery request.

Embodiment 14. The method of embodiment 13, comprising transmitting the discovery request responsive to receiving the message.

Embodiment 15. The method of any of embodiments 13-14, wherein the discovery service is implemented by a network repository function, NRF.

Embodiment 16. The method of any of embodiments 1-12, comprising receiving the protection policy from network equipment in a path that the message takes from a source of the message to the destination of the message.

Embodiment 17. The method of any of embodiments 1-12 and 16, comprising receiving the protection policy from either a source of the message or the destination of the message.

Embodiment 18. The method of any of embodiments 1-12 and 16, comprising receiving the protection policy from other network equipment from which the message is received, wherein the other network equipment is also configured as a proxy between the different core network domains.

Embodiment 19. The method of any of embodiments 1-12 and 16-18, wherein the protection policy is included in the message.

Embodiment 20. The method of any of embodiments 1-12 and 16-19, wherein the protection policy is included in a header of the message.

Embodiment 21. The method of any of embodiments 1-20, wherein the message is an application layer message, wherein the field is an application layer field, wherein the content of the field comprises application layer information, and wherein the inter-domain security protection comprises application layer protection.

Embodiment 22. The method of any of embodiments 1-21, wherein the network equipment is configured as a Security Edge Protection Proxy, SEPP.

Embodiment 23. The method of any of embodiments 1-22, wherein the core network domains comprise core networks of different public land mobile networks, PLMNs.

Embodiment 24. A method performed by network equipment for facilitating protection of a message transmitted between different core network domains of a wireless communication system, the method comprising: obtaining a protection policy that includes information indicating to which one or more portions of the content of a field in the message inter-domain security protection is to be applied or removed; and transmitting the protection policy.

Embodiment 25. The method of embodiment 24, wherein the information includes one or more regular expressions that indicate the one or more portions.

Embodiment 26. The method of embodiment 24, wherein the information includes one or more JavaScript Object Notation, JSON, Pointers, that indicate the one or more portions.

Embodiment 27. The method of embodiment 24, wherein the information includes one or more ranges of bytes within the field, and/or one or more ranges of bits within the field, that indicate the one or more portions.

Embodiment 28. The method of embodiment 24, wherein the information includes one or more search patterns, one or more tokens, and/or one or more substrings, that indicate the one or more portions.

Embodiment 29. The method of any of embodiments 24-28, wherein the protection policy further indicates, for each of the one or more portions, a type of inter-domain security protection to be applied or removed.

Embodiment 30. The method of any of embodiments 24-29, wherein, for each of the one or more portions, the inter-domain security protection to be applied or removed comprises confidentiality protection and/or integrity protection.

Embodiment 31. The method of any of embodiments 24-30, wherein the message is a Hypertext Transfer Protocol (HTTP) message and the field is an HTTP field.

Embodiment 32. The method of embodiment 31, wherein the HTTP message is an HTTP request message and the field is a path field, and wherein the content of the path field is a request Uniform Resource Identifier, URI.

Embodiment 33. The method of embodiment 31, wherein the field is a field of an HTTP header or an HTTP pseudo header.

Embodiment 34. The method of embodiment 31, wherein the field is a body part of the HTTP message.

Embodiment 35. The method of any of embodiments 24-34, wherein transmitting the protection policy comprises transmitting the protection policy to network equipment configured, as a proxy one of the different core network domains, to apply inter-domain security protection to, or remove inter-domain security protection from, the one or more portions according to the protection policy.

Embodiment 36. The method of any of embodiments 24-35, further comprising receiving a discovery request requesting discovery of the protection policy for protecting the message, and transmitting the protection policy in response to the discovery request.

Embodiment 37. The method of embodiment 36, wherein the method is performed by network equipment that implements a network repository function, NRF.

Embodiment 38. The method of any of embodiments 24-35, wherein the method is performed by network equipment in a path that the message takes from a source of the message to the destination of the message.

Embodiment 39. The method of any of embodiments 24-35 and 38, wherein the method is performed by network equipment that is a source of the message or a destination of the message.

Embodiment 40. The method of any of embodiments 24-35 and 38, wherein the method is performed by network equipment configured as a proxy between the different core network domains.

Embodiment 41. The method of any of embodiments 24-35 and 38-40, wherein transmitting the protection policy comprises transmitting the message with the protection policy included in the message.

Embodiment 42. The method of any of embodiments 24-41, wherein the message is an application layer message, wherein the field is an application layer field, wherein the content of the field comprises application layer information, and wherein the inter-domain security protection comprises application layer protection.

Embodiment 43. The method of any of embodiments 24-42, wherein the core network domains comprise core networks of different public land mobile networks, PLMNs.

Embodiment 44. Network equipment configured as a proxy for one of multiple different core network domains of a wireless communication system. The network equipment is configured to: receive a message that has been, or is to be, transmitted between the different core network domains; receive a protection policy that includes information indicating to which one or more portions of the content of a field in the message inter-domain security protection is to be applied or removed; apply inter-domain security protection to, or remove inter-domain security protection from, the one or more portions according to the protection policy; and forward the message, with inter-domain security protection applied or removed to the one or more portions, towards a destination of the message.

Embodiment 45. The network equipment of embodiment 44, wherein the information includes one or more regular expressions that indicate the one or more portions.

Embodiment 46. The network equipment of embodiment 44, wherein the information includes one or more JavaScript Object Notation, JSON, Pointers, that indicate the one or more portions.

Embodiment 47. The network equipment of embodiment 44, wherein the information includes one or more ranges of bytes within the field, and/or one or more ranges of bits within the field, that indicate the one or more portions.

Embodiment 48. The network equipment of embodiment 44, wherein the information includes one or more search patterns, one or more tokens, and/or one or more substrings, that indicate the one or more portions.

Embodiment 49. The network equipment of any of embodiments 44-48, further comprising extracting the one or more portions of the content of the field for applying or removing inter-domain security protection, by parsing the content using the information included in the protection policy.

Embodiment 50. The network equipment of any of embodiments 44-49, wherein the protection policy further indicates, for each of the one or more portions, a type of inter-domain security protection to be applied or removed.

Embodiment 51. The network equipment of any of embodiments 44-50, wherein, for each of the one or more portions, the inter-domain security protection to be applied or removed comprises confidentiality protection and/or integrity protection.

Embodiment 52. The network equipment of any of embodiments 44-51, wherein the message is a Hypertext Transfer Protocol (HTTP) message and the field is an HTTP field.

Embodiment 53. The network equipment of embodiment 52, wherein the HTTP message is an HTTP request message and the field is a path field, and wherein the content of the path field is a request Uniform Resource Identifier, URI.

Embodiment 54. The network equipment of embodiment 52, wherein the field is a field of an HTTP header or an HTTP pseudo header.

Embodiment 55. The network equipment of embodiment 52, wherein the field is a body, or a part of the body, of the HTTP message.

Embodiment 56. The network equipment of any of embodiments 44-55, further comprising transmitting a discovery request to a discovery service requesting discovery of the protection policy for protecting the message, and receiving the protection policy in response to the discovery request.

Embodiment 57. The network equipment of embodiment 56, comprising transmitting the discovery request responsive to receiving the message.

Embodiment 58. The network equipment of any of embodiments 56-57, wherein the discovery service is implemented by a network repository function, NRF.

Embodiment 59. The network equipment of any of embodiments 44-55, comprising receiving the protection policy from network equipment in a path that the message takes from a source of the message to the destination of the message.

Embodiment 60. The network equipment of any of embodiments 44-55 and 59, comprising receiving the protection policy from either a source of the message or the destination of the message.

Embodiment 61. The network equipment of any of embodiments 44-55 and 59, comprising receiving the protection policy from other network equipment from which the message is received, wherein the other network equipment is also configured as a proxy between the different core network domains.

Embodiment 62. The network equipment of any of embodiments 44-55 and 59-61, wherein the protection policy is included in the message.

Embodiment 63. The network equipment of any of embodiments 44-55 and 59-62, wherein the protection policy is included in a header of the message.

Embodiment 64. The network equipment of any of embodiments 44-63, wherein the message is an application layer message, wherein the field is an application layer field, wherein the content of the field comprises application layer information, and wherein the inter-domain security protection comprises application layer protection.

Embodiment 65. The network equipment of any of embodiments 44-64, wherein the network equipment is configured as a Security Edge Protection Proxy, SEPP.

Embodiment 66. The network equipment of any of embodiments 44-65, wherein the core network domains comprise core networks of different public land mobile networks, PLMNs.

Embodiment 67. Network equipment for facilitating protection of a message transmitted between different core network domains of a wireless communication system. The network equipment is configured to: obtain a protection policy that includes information indicating to which one or more portions of the content of a field in the message inter-domain security protection is to be applied or removed; and transmit the protection policy.

Embodiment 68. The network equipment of embodiment 67, wherein the information includes one or more regular expressions that indicate the one or more portions.

Embodiment 69. The network equipment of embodiment 67, wherein the information includes one or more JavaScript Object Notation, JSON, Pointers, that indicate the one or more portions.

Embodiment 70. The network equipment of embodiment 67, wherein the information includes one or more ranges of bytes within the field, and/or one or more ranges of bits within the field, that indicate the one or more portions.

Embodiment 71. The network equipment of embodiment 67, wherein the information includes one or more search patterns, one or more tokens, and/or one or more substrings, that indicate the one or more portions.

Embodiment 72. The network equipment of any of embodiments 67-71, wherein the protection policy further indicates, for each of the one or more portions, a type of inter-domain security protection to be applied or removed.

Embodiment 73. The network equipment of any of embodiments 67-72, wherein, for each of the one or more portions, the inter-domain security protection to be applied or removed comprises confidentiality protection and/or integrity protection.

Embodiment 74. The network equipment of any of embodiments 67-75, wherein the message is a Hypertext Transfer Protocol (HTTP) message and the field is an HTTP field.

Embodiment 75. The network equipment of embodiment 74, wherein the HTTP message is an HTTP request message and the field is a path field, and wherein the content of the path field is a request Uniform Resource Identifier, URI.

Embodiment 76. The network equipment of embodiment 74, wherein the field is a field of an HTTP header or an HTTP pseudo header.

Embodiment 77. The network equipment of embodiment 74, wherein the field is a body part of the HTTP message.

Embodiment 78. The network equipment of any of embodiments 67-77, wherein transmitting the protection policy comprises transmitting the protection policy to network equipment configured, as a proxy one of the different core network domains, to apply inter-domain security protection to, or remove inter-domain security protection from, the one or more portions according to the protection policy.

Embodiment 79. The network equipment of any of embodiments 67-78, further comprising receiving a discovery request requesting discovery of the protection policy for protecting the message, and transmitting the protection policy in response to the discovery request.

Embodiment 80. The network equipment of embodiment 79, wherein the method is performed by network equipment that implements a network repository function, NRF.

Embodiment 81. The network equipment of any of embodiments 67-78, wherein the method is performed by network equipment in a path that the message takes from a source of the message to the destination of the message.

Embodiment 82. The network equipment of any of embodiments 67-78 and 81, wherein the method is performed by network equipment that is a source of the message or a destination of the message.

Embodiment 83. The network equipment of any of embodiments 67-78 and 81, wherein the method is performed by network equipment configured as a proxy between the different core network domains.

Embodiment 84. The network equipment of any of embodiments 67-78 and 81-83, wherein transmitting the protection policy comprises transmitting the message with the protection policy included in the message.

Embodiment 85. The network equipment of any of embodiments 67-84, wherein the message is an application layer message, wherein the field is an application layer field, wherein the content of the field comprises application layer information, and wherein the inter-domain security protection comprises application layer protection.

Embodiment 86. The network equipment of any of embodiments 67-85, wherein the core network domains comprise core networks of different public land mobile networks, PLMNs.

Embodiment 87. Network equipment configured as a proxy for one of multiple different core network domains of a wireless communication system. The network equipment comprises communication circuitry and processing circuitry wherein the network equipment is configured to receive a message that has been, or is to be, transmitted between the different core network domains; receive a protection policy that includes information indicating to which one or more portions of the content of a field in the message inter-domain security protection is to be applied or removed; apply inter-domain security protection to, or remove inter-domain security protection from, the one or more portions according to the protection policy; and forward the message, with inter-domain security protection applied or removed to the one or more portions, towards a destination of the message.

Embodiment 88. The network equipment of embodiment 87, configured to perform the method of any of embodiments 2-23.

Embodiment 89. Network equipment for facilitating protection of a message transmitted between different core network domains of a wireless communication system. The network equipment comprises communication circuitry and processing circuitry wherein the network equipment is configured to obtain a protection policy that includes information indicating to which one or more portions of the content of a field in the message inter-domain security protection is to be applied or removed; and transmit the protection policy.

Embodiment 90. The network equipment of embodiment 89, configured to perform the method of any of embodiments 25-43.

Embodiment 91. A computer program comprising instructions which, when executed by at least one processor of network equipment, causes the network equipment device to perform the method of any of embodiments 1-343.

Embodiment 92. A carrier containing the computer program of embodiment 91, wherein the carrier is one of an electronic signal, optical signal, radio signal, or computer readable storage medium.

What is claimed is:

1. A method performed by a Security Edge Protection Proxy (SEPP), comprising:
   receiving a message that is to be transmitted;
   applying inter-domain security protection to one or more portions of the content of a field in the message according to a protection policy that includes information indicating to which one or more portions of the content inter-domain security protection is to be applied, wherein the information comprises one or more JavaScript Object Notation (JSON) pointers that indicate the one or portions to which the inter-domain security protection is to be applied; and forwarding the message, with inter-domain security protection applied to the one or more portions, towards a destination of the message, wherein the protection policy further indicates, for each of the one or more portions, a type of inter-domain security protection to be applied, and wherein, for each of the one or more portions, the type of inter-domain security protection to be applied comprises confidentiality protection.

2. The method of claim 1, wherein the message is a Hypertext Transfer Protocol (HTTP) message and the field is an HTTP field.

3. The method of claim 2, wherein the HTTP message is an HTTP request message and the field is a path field, and wherein the content of the path field is a request Uniform Resource Identifier, URI.

4. The method of claim 1, wherein the information includes one or more regular expressions that indicate the one or more portions.

5. The method of claim 1, wherein the protection policy is included in the message.

6. The method of claim 1, further comprising, responsive to receiving the message, transmitting a discovery request to a network repository function, NRF, requesting discovery of the protection policy for protecting the message, and receiving the protection policy in response to the discovery request.

7. The method of claim 1, further comprising receiving the protection policy from network equipment in a path that the message takes from a source of the message to the destination of the message.

8. The method of claim 1, wherein the SEPP comprises SEPP in a visited network, vSEPP, and SEPP in a home network, hSEPP.

9. A Security Edge Protection Proxy (SEPP), wherein the network equipment comprises:
communication circuitry; and
processing circuitry connected to the communication circuitry, wherein the network equipment is configured to:
receive, via the communication circuitry, a message that is to be transmitted;
apply inter-domain security protection to one or more portions of the content of a field in the message according to a protection policy that includes information indicating to which one or more portions of the content inter-domain security protection is to be applied, wherein the information comprises one or more JavaScript Object Notation (JSON) pointers that indicate the one or portions to which the inter-domain security protection is to be applied; and
forward the message, with inter-domain security protection applied to the one or more portions, towards a destination of the message via the communication circuitry, wherein the protection policy further indicates, for each of the one or more portions, a type of inter-domain security protection to be applied, and wherein, for each of the one or more portions, the type of inter-domain security protection to be applied comprises confidentiality protection.

10. The SEPP of claim 9, wherein the message is a Hypertext Transfer Protocol (HTTP) message and the field is an HTTP field.

11. The SEPP of claim 10, wherein the HTTP message is an HTTP request message and the field is a path field, and wherein the content of the path field is a request Uniform Resource Identifier, URI.

12. The SEPP of claim 10, wherein the information includes one or more regular expressions that indicate the one or more portions.

13. The SEPP of claim 10, wherein the protection policy is included in the message.

14. The SEPP of claim 10, wherein the processing circuitry is further configured to, responsive to receiving the message, transmit a discovery request to a network repository function, NRF, request discovery of the protection policy for protecting the message, and receive the protection policy in response to the discovery request.

15. The SEPP of claim 10, wherein the processing circuitry is further configured to receive the protection policy from the SEPP in a path that the message takes from a source of the message to the destination of the message.

16. The SEPP of claim 15, wherein the SEPP comprises SEPP in a visited network and vSEPP in a home network, hSEPP.

* * * * *